United States Patent
Shimanaka et al.

(10) Patent No.: US 11,524,727 B2
(45) Date of Patent: Dec. 13, 2022

(54) SIDE VEHICLE BODY STRUCTURE OF VEHICLE

(71) Applicant: MAZDA MOTOR CORPORATION, Hiroshima (JP)

(72) Inventors: Tsuneki Shimanaka, Aki-gun (JP); Taiki Yotsuyanagi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 72 days.

(21) Appl. No.: 17/178,044

(22) Filed: Feb. 17, 2021

(65) Prior Publication Data

US 2021/0276626 A1    Sep. 9, 2021

(30) Foreign Application Priority Data

Mar. 6, 2020    (JP) .............................. JP2020-038730

(51) Int. Cl.
| | |
|---|---|
| *B62D 25/20* | (2006.01) |
| *F01N 3/02* | (2006.01) |
| *F01N 3/021* | (2006.01) |
| *F01N 13/18* | (2010.01) |

(52) U.S. Cl.
CPC ......... *B62D 25/2036* (2013.01); *F01N 3/021* (2013.01); *F01N 3/0211* (2013.01); *F01N 13/1805* (2013.01); *F01N 13/1822* (2013.01)

(58) Field of Classification Search
CPC .... F01N 3/021; F01N 3/0211; F01N 13/1805; F01N 13/1822; B26D 25/2036
See application file for complete search history.

(56) References Cited

U.S. PATENT DOCUMENTS

2018/0072352 A1    3/2018   Shimoda
2020/0102031 A1*   4/2020   Nagata ................. B62D 65/16

FOREIGN PATENT DOCUMENTS

JP        2018-039452 A       3/2018

* cited by examiner

*Primary Examiner* — Audrey B. Walter
(74) *Attorney, Agent, or Firm* — Studebaker & Brackett PC

(57) ABSTRACT

An exhaust system member is provided on a vehicle-width-direction outer side relative to a vehicle body structure such as a side sill, while avoiding widening of the vehicle, enhancing shock absorption performance during a collision, and maintaining rigidity of the vehicle body. Embodiments include an engine disposed forward of a vehicle cabin, an engine exhaust system, and a hinge pillar extending vertically. The exhaust system includes a first exhaust system member beside the hinge pillar in the vehicle front-rear direction from the vehicle-width-direction outer side of the hinge pillar and extending forward of the hinge pillar, a second exhaust system member rearward of the hinge pillar, and a connection part connecting these exhaust system members. The connection part has a smaller length in the vehicle width direction than at least one of the first and second exhaust system members, and overlaps with the hinge pillar in the vehicle front-rear direction.

11 Claims, 8 Drawing Sheets

SIDE VEHICLE BODY STRUCTURE OF VEHICLE

TECHNICAL FIELD

The present disclosure relates to a side vehicle body structure of a vehicle which includes, for example, an internal combustion engine equipped on the front side of a partition wall defining a front edge of a vehicle cabin space, an exhaust apparatus through which exhaust gas exhausted from the internal combustion engine passes, and a pillar extending in the vehicle up-down direction.

BACKGROUND ART

In a vehicle, a structure has been known in which at least a part of an exhaust system member (for example, a filter for exhaust treatment, an exhaust pipe, or a silencer) forming an exhaust apparatus is provided not at the vehicle-width-direction center under a floor but on the vehicle-width-direction outer side relative to the floor (i.e., a lower portion of the vehicle on the vehicle-width-direction outer side).

The aim of adopting such a configuration is roughly classified into cases where a vehicle body layout property is desired and where motion performance of a vehicle body is emphasized. In the former case, for example, in a vehicle adopting a system using an internal combustion engine and a motor in combination as in a hybrid car or a range extender car, a vehicle has been known in which, for example, in order to avoid a battery disposed under a floor, an exhaust system member is provided on the vehicle-width-direction outer side relative to the battery under the floor (for example, see Japanese Patent Laid-Open No. 2018-39452). In the latter case, a vehicle has been known in which, for example, as in a sports car, in order to dispose a heavy object near the center of a vehicle body, an exhaust system member, which is relatively light, is disposed at a lower portion of the vehicle on the vehicle-width-direction outer side.

Here, as an example in which the heavy object is disposed near the center of the vehicle body, the center of gravity of occupants seated on a driver seat and a passenger seat is lowered, or an interval in the vehicle width direction between the driver seat and the passenger seat which are adjacent to each other is narrowed.

On the other hand, as a specific example in which the exhaust system member is disposed at the lower portion of the vehicle on the vehicle-width-direction outer side, it is conceivable to lay out the exhaust system member in the vicinity of the vehicle-width-direction outer side of a vehicle body structure such as a side sill which is provided on the side of a floor.

However, in a case where the exhaust system member, which is relatively light, is laid out on the outer side of the vehicle body structure provided on the side of the floor, a problem occurs in which the width of the vehicle expands by a width corresponding to that of the exhaust system member. Thus, in a case where the exhaust system member, which is relatively light, is laid out on the outer side of the vehicle body structure with an even more emphasis on the motion performance of the vehicle, there is room for improvement.

In particular, a vehicle body is required to have, for example, a shock absorption performance for the time of collision and a certain rigidity, and these requirements need to be satisfied to preserve the motion performance of the vehicle to the extent possible.

SUMMARY

The present disclosure has been made in view of such problem, and so provides a side vehicle body structure of a vehicle which can, even in a case where an exhaust system member is provided on the vehicle-width-direction outer side relative to a vehicle body structure, avoid widening of the vehicle and maintain a shock absorption performance of a vehicle body at the time of a collision, and the rigidity of the vehicle body.

The present disclosure relates to a side vehicle body structure of a vehicle which includes an internal combustion engine equipped on the front side of a partition wall defining a front edge of a vehicle cabin space, an exhaust apparatus through which exhaust gas exhausted from the internal combustion engine passes, and a pillar extending in the vehicle up-down direction, wherein the exhaust apparatus includes a first exhaust system member beside the pillar in the vehicle front-rear direction from the vehicle-width-direction outer side of the pillar and provided forward relative to the pillar, a second exhaust system member provided rearward relative to the pillar, and a connection part connecting these first and second exhaust system members, and the connection part is formed to have a smaller length in the vehicle width direction than at least one of the first exhaust system member and the second exhaust system member and is disposed at a position overlapping with the pillar in the vehicle front-rear direction.

According to this configuration, the connection part having the smaller length in the vehicle width direction than the first and/or second exhaust system members is disposed at the position of the pillar in the vehicle front-rear direction, so that, as the length of the connection part in the vehicle width direction is small, a cross section of the pillar can be enlarged. Accordingly, while the cross section of the pillar is maintained, widening of the vehicle body can be avoided.

Accordingly, while a shock absorption performance of the vehicle body at the time of collision and rigidity of the vehicle body are ensured, widening of the vehicle body is avoided, contributing to enhancement of motion performance.

Here, the connection part is not limited to a connection component such as an exhaust pipe and may be a connection portion provided at a part of at least one of the first exhaust system member and the second exhaust system member and having a connection function with, for example, a component for connection.

Furthermore, each of the first exhaust system member and the second exhaust system member is not limited to a member such as a GPF including, for example, a filter that treats exhaust gas (gas) from the internal combustion engine and may be, for example, a member having a silencing function such as a silencer or a catalyzer, or an exhaust pipe itself.

In one aspect of the present disclosure, provided is a vehicle body structure extending along the vehicle front-rear direction on the side of a floor forming a floor surface of the vehicle cabin space, wherein the vehicle body structure overlaps with the pillar in a vehicle side view and overlaps with the connection part in the vehicle width direction. According to this configuration, the vehicle body structure overlaps with the connection part in the vehicle width direction at an overlapping portion with the pillar in a vehicle side view, so that it is possible for the vehicle body structure to secure a long cross-sectional length in the vehicle width direction within a range of widening because of the provision of the connection part on the vehicle-width-direction outer side relative to the pillar. Accordingly, while the cross-sectional length (rigidity) of the vehicle body structure in the vehicle width direction is maintained, widening of the vehicle body can be avoided.

In another aspect of the present disclosure, the vehicle body structure overlaps with the second exhaust system member in a vehicle side view and, at an overlapping portion in this vehicle side view, has a recess having a cross section recessed toward the vehicle-width-direction inner side relative to a vehicle-width-direction outer end of the pillar from the vehicle-width-direction outer side in a cross-sectional view orthogonal to the vehicle front-rear direction, and the second exhaust system member is disposed at the recess. According to this configuration, even in a case where the second exhaust system member is formed to have a large length in the vehicle width direction by the connection part, the second exhaust system member can be disposed at the recess of the vehicle body structure, so that widening of the vehicle can be avoided, and a cross section of the pillar which is orthogonal to the vehicle up-down direction can be maintained.

In a further aspect of the present disclosure, the side sill extends between the front and rear sides of the pillar so as to be capable of supporting each of the first exhaust system member, the connection part, and the second exhaust system member from the lower side. According to this configuration, each of the first exhaust system member, the connection part, and the second exhaust system member which are disposed in the vehicle front-rear direction beside the pillar from the vehicle-width-direction outer side of the pillar can be stably supported by the vehicle body structure, and strength (rigidity) of a coupling portion with the vehicle body structure of the pillar can be enhanced over the front and rear sides of the pillar and the periphery on the vehicle-width-direction outer side thereof.

In a still further aspect of the present disclosure, on the vehicle-width-direction inner side of the first exhaust system member, a frame member is provided which overlaps with the first exhaust system member in a vehicle side view and has an outer face in the vehicle width direction which is provided to be substantially flush with a vehicle-width-direction outer face of the pillar or is provided on the vehicle-width-direction inner side relative to the vehicle-width-direction outer face, and, below the frame member, a secondary connection part is routed which connects the internal combustion engine provided on the inner side of the frame member in the vehicle width direction and the first exhaust system member provided on the outer side of the frame member in the vehicle width direction. According to this configuration, a front wheel receding at the time of an overlap collision can be received by the frame member, so that the front wheel can be prevented from entering the vehicle cabin.

Furthermore, when the connection part is disposed near the pillar side in the vehicle width direction, the first exhaust system member is also disposed near the frame member side in the vehicle width direction. However, even in such a case, the secondary connection part can be routed below the frame member, so that the secondary connection part and the frame member do not interfere with each other. Accordingly, the connection part can be caused to firmly come near the pillar side in the vehicle width direction, so that widening of the vehicle body can be consequently avoided.

Although the frame member intervenes between the internal combustion engine and the first exhaust system member in the vehicle width direction, the secondary connection part can be routed below the frame member, as described above. Accordingly, the internal combustion engine and the first exhaust system member can be connected at a shortest possible distance by the secondary connection part, so that exhaust gas from the internal combustion engine can be smoothly introduced into the first exhaust system member consequently.

According to this configuration, even in a case where the exhaust system member is provided on the vehicle-width-direction outer side relative to the vehicle body structure, widening of the vehicle can be avoided, and the shock absorption performance of the vehicle body at the time of a collision, and the rigidity of the vehicle body, can be maintained.

DETAILED DESCRIPTION

An embodiment of the present disclosure will be explained with reference to the following drawings. A vehicle of the present embodiment is a sports car adopting a so-called space frame structure coupling a plurality of extruded frames made of an aluminum alloy and forming a vehicle body framework, and adopting a center pillar-less structure in which a side door is of a two-door type. A side vehicle body structure of such a vehicle will be explained with reference to FIGS. 1 to 8.

In order to clarify illustration, in the figures, illustration of a front suspension and a rear suspension is omitted, and detailed illustration of a suspension support member supporting these suspensions, which will be described later, is omitted.

Furthermore, in the figures, arrow F indicates the vehicle front direction; arrow R, the vehicle right direction; arrow L, the vehicle left direction; arrow U, the vehicle upper direction.

Figure 1:
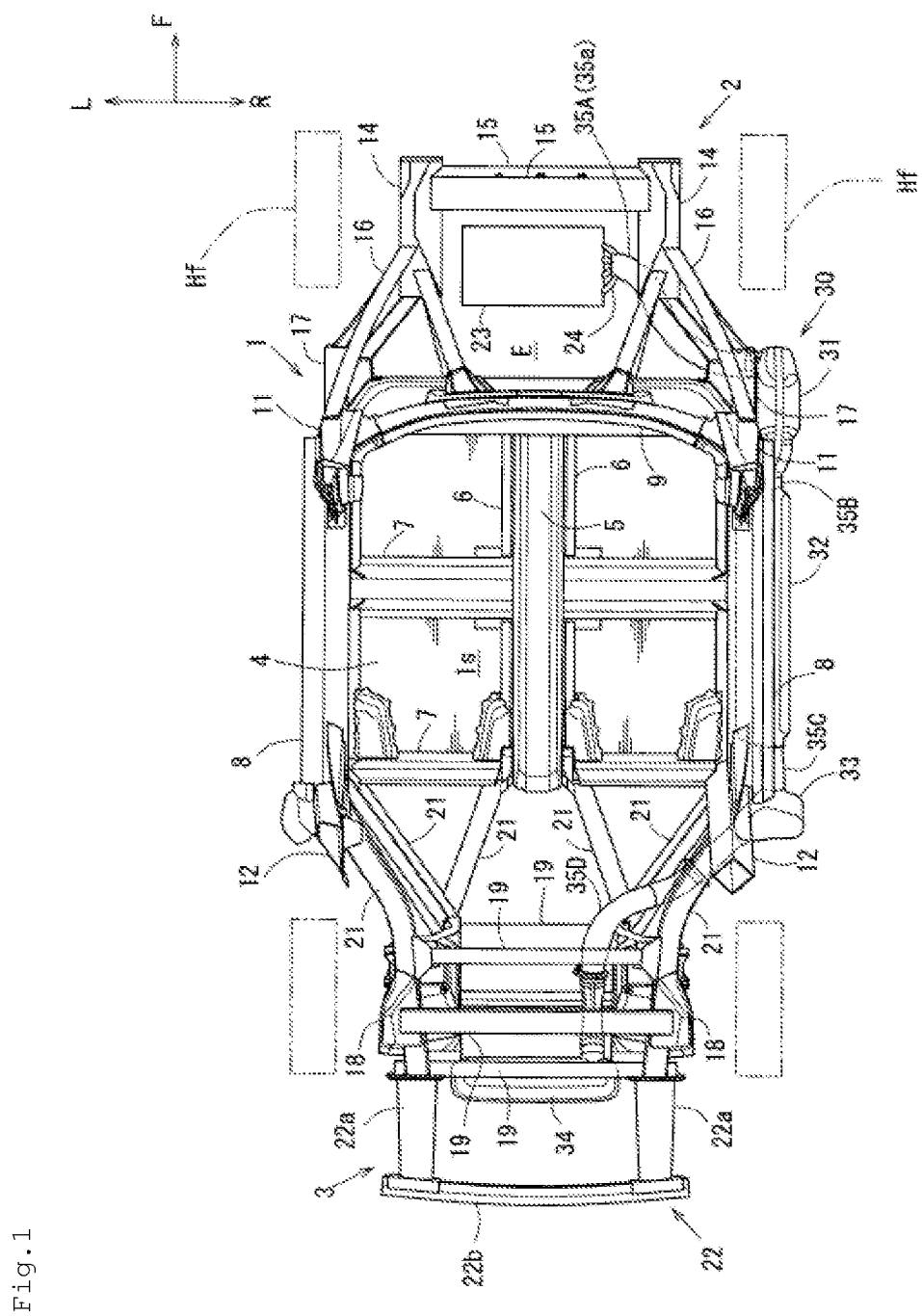
FIG. 1 is a plan view illustrating a main portion of a vehicle including a side vehicle body structure of the present embodiment.
Figure 2:
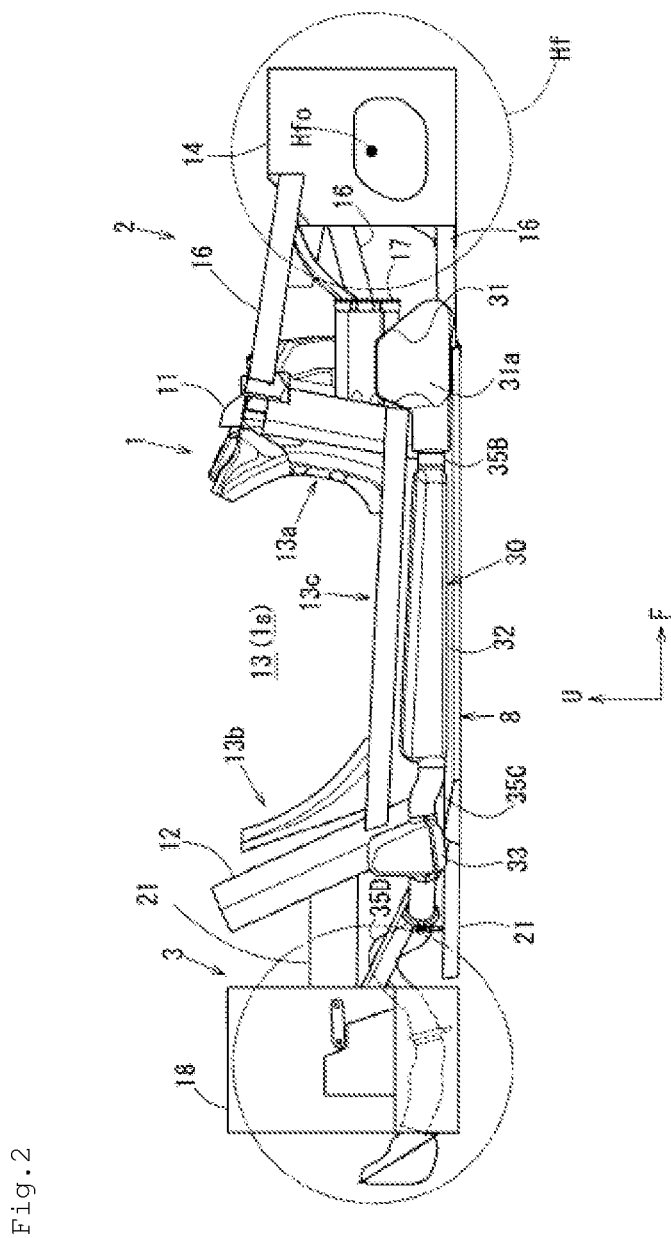
FIG. 2 is a left side view illustrating the main portion of the vehicle including the side vehicle body structure of the present embodiment.

As illustrated in FIGS. 1 and 2, the vehicle including the side vehicle body structure of the present embodiment includes a vehicle cabin 1 for an occupant to get in, a front vehicle body 2 provided on the vehicle front side relative to the vehicle cabin 1, and a rear vehicle body 3 provided on the vehicle rear side relative to the vehicle cabin 1.

As illustrated in FIG. 1, the vehicle cabin 1 and the front vehicle body 2 are partitioned by a dash panel 9 in a raised wall shape. That is, the dash panel 9 serves as a partition wall defining a front edge of a vehicle cabin space is provided inside the vehicle cabin 1 and is disposed between the vehicle cabin 1 and the front vehicle body 2.

As illustrated in FIG. 1, the vehicle cabin 1 includes a floor panel 4 forming a floor (floor surface) of the vehicle cabin 1, a tunnel frame 5 extending in the vehicle front-rear direction above a center position of the floor panel 4 in the vehicle width direction, a tunnel side frame 6 extending in the vehicle front-rear direction at a corner between a side wall on each of both sides of the tunnel frame 5 and the floor panel 4, and a plurality of floor cross members 7 each coupling the tunnel frame 5 and a side sill 8 in the vehicle width direction.

As illustrated in FIGS. 1 and 2, both sides of the floor panel 4 of the vehicle cabin 1 in the vehicle width direction include the pair of left and right side sills 8 extending in the vehicle front-rear direction, hinge pillars 11 (front-side pillars) each extending upward from a front end of the side sill 8, and rear pillars 12 (rear-side pillars) each extending upward from a rear end of the side sill 8.

As illustrated in FIG. 2, on the above-described both sides of the vehicle cabin 1, door openings 13 through which the occupant enters and exits the vehicle cabin 1 are provided. A hinge pillar 11, a rear pillar 12, and the side sill 8 are provided along a front edge 13*a*, rear edge 13*b*, and lower edge 13*c* of the door opening 13, respectively.

As illustrated in FIGS. 1 and 2, the front vehicle body 2 includes a pair of left and right front suspension support members 14 supporting a front suspension (illustration omitted), a plurality of front-side cross members 15 (see FIG. 1) each coupling the pair of left and right front suspension support members 14 in the vehicle width direction, a plurality of front-side coupling frames 16 each coupling the vehicle cabin 1 and the front suspension support member 14, and a front shock absorption structure (illustration omitted) that absorbs a shock load from the vehicle front side.

As illustrated in FIG. 1, the front suspension support member 14 is located on the vehicle-width-direction inner side of the side sill 8 corresponding to each of the left and right sides and pivotally supports a front wheel Hf via the front suspension, which is not illustrated. The front wheel Hf is provided on the vehicle front side relative to the front end of the side sill 8 and on the vehicle-width-direction outer side relative to the front suspension support member 14. The front suspension support member 14 is manufactured by, for example, die cast molding of an aluminum alloy.

Further, as illustrated in FIGS. 1 and 2, the front vehicle body 2 includes, at a position spaced apart rearward from the front wheel Hf, a tire stopper frame 17 extending toward the vehicle front side from a front portion of the hinge pillar 11.

Although illustration is omitted, the front shock absorption structure includes a crash can formed of, for example, a cylindrical body extending in the vehicle front-rear direction from the front end side of the front suspension support member 14, and a bumper reinforcement extending in the vehicle width direction so as to couple front ends of the pair of left and right crash cans.

The rear vehicle body 3 includes a pair of left and right rear suspension support members 18 supporting a rear suspension, a plurality of rear-side cross members 19 (see FIG. 1) each coupling the pair of left and right rear suspension support members 18 in the vehicle width direction, a plurality of rear-side coupling frames 21 each coupling the vehicle cabin 1 and the rear suspension support member 18, and a rear shock absorption structure 22 that absorbs a shock load from the vehicle rear side. Illustration of not only the above-described front shock absorption structure but also the rear shock absorption structure 22 is omitted in FIG. 2.

As illustrated in FIG. 1, the rear shock absorption structure 22 includes a crash can 22*a* formed of, for example, a cylindrical body extending toward the vehicle rear side from the rear end side of the rear suspension support member 18, and a bumper reinforcement 22*b* extending in the vehicle width direction so as to couple rear ends of the pair of left and right crash cans 22*a*.

As also illustrated in FIG. 1, in a front portion of the vehicle of the present embodiment, an area between the pair of left and right front suspension support members 14 is formed as an engine room E, and the engine room E is equipped with an engine 23. An exhaust apparatus 30 (exhaust unit) is connected to an exhaust port provided on the side wall side of this engine 23, via an exhaust manifold 24.

The exhaust apparatus 30 includes, as exhaust system members, a GPF 31 (gasoline particulate filter), a first pre-silencer 32, a second pre-silencer 33, a main silencer 34, and a tail pipe (illustration omitted). The exhaust manifold 24 and the GPF 31 are connected by a connection part 35A, the above-described exhaust system members 31 and 32 are connected by a connection part 35B, the above-described exhaust system members 32 and 33 are connected by a connection part 35C, and the above-described exhaust system members 33 and 34 are connected by a connection part 35D. The GPF 31 has a body 31*a* including a filter 31*aa* that, as an exhaust treatment device that treats exhaust gas of the engine 23, collects a particulate matter (PM) included in the exhaust gas. Each of the silencers (the first pre-silencer 32, the second pre-silencer 33, and the main silencer 34) reduces a sound when the exhaust gas is released to the atmosphere.

Although the connection parts 35A, 35B, 35C, and 35D are formed by mainly an exhaust pipe 35*a*, the connection parts 35A, 35B, 35C, and 35D are provided at, as exhaust system members, the GPF 31, the silencers 32, 33, and 34, and the like and also formed to include the exhaust pipe 35*a* and connection portions having a function of connecting to the other exhaust system members 31, 32, 33, and 34. Each of the connection parts 35A, 35B, 35C, and 35D, not limited to formation including both the exhaust pipe 35*a* and the connection portion provided in the exhaust system member, can be formed by at least one of these.

In the exhaust apparatus 30, the GPF 31, the first pre-silencer 32, the second pre-silencer 33, and the main silencer 34 are each routed along an exhaust path extending rearward from the front side of the vehicle body via the connection part. In this example, the exhaust apparatus 30 is routed along such an exhaust path that detours toward the vehicle-width-direction outer side (the vehicle right side, in this example) in the middle of extending toward the vehicle rear side. Specifically, the exhaust apparatus 30 is routed in the front vehicle body 2 from, in the vehicle width direction, the inner side equipped with the engine 23 toward the outer side and routed toward the vehicle rear side along a side portion of the vehicle cabin 1, and the exhaust apparatus 30 is routed again in the rear vehicle body 3 from the vehicle-width-direction outer side toward the inner side and routed toward the vehicle rear side. Thus, the exhaust system member, which is relatively light, is laid out on the vehicle-width-direction outer side, so that a heavy object can be laid out at the vehicle center relative to the exhaust system member, consequently contributing to enhancement of motion performance of the vehicle.

Figure 3A:
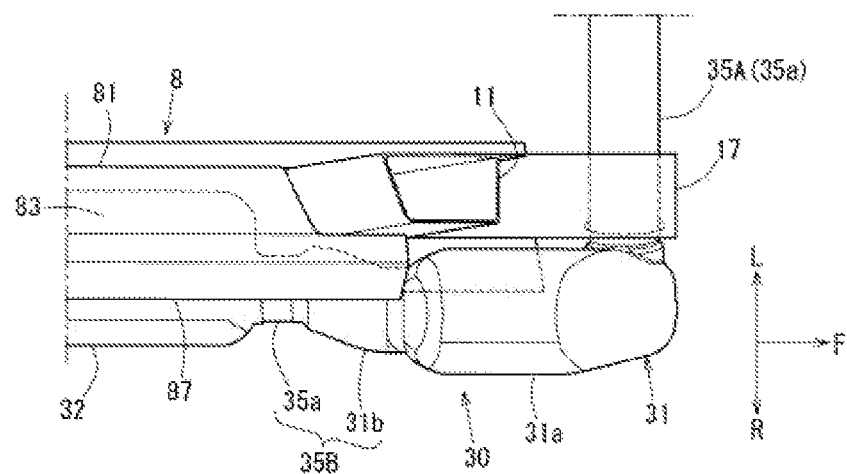
FIG. 3A is a plan view illustrating a front portion of the side vehicle body structure of the present embodiment.
Figure 3B:
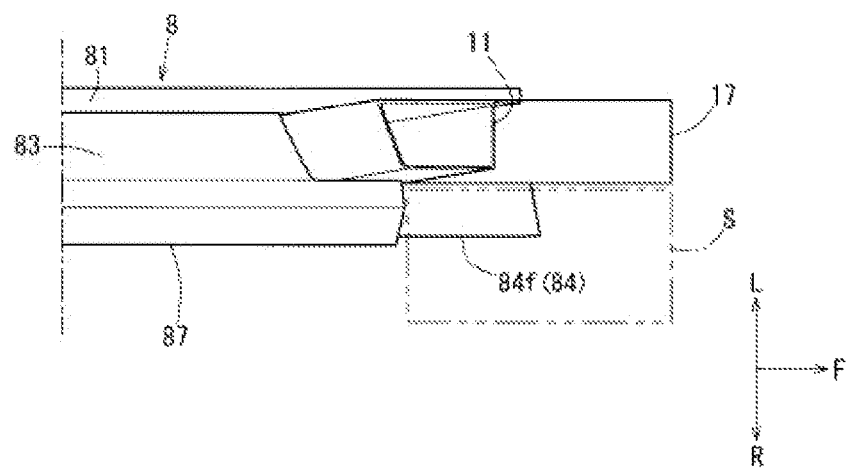
FIG. 3B is a plan view illustrated with an exhaust system member removed from FIG. 3A.

Hereinafter, the vehicle body side structure of the present embodiment will be explained in more detail with reference to FIGS. 3 to 8, in addition to FIGS. 1 and 2. As illustrated in FIGS. 4B and 6, the side sill 8 is configured with a two-divided structure including a side sill upper 81 and a side sill lower 82 on the upper and lower sides. The side sill upper 81 and the side sill lower 82 are both frame members each formed by extrusion of an aluminum alloy material as described above, and respectively have closed cross-sectional spaces 83s and 84s (see FIG. 6) inside which extend over the full length in the vehicle front-rear direction.

The side sill upper 81 is formed by integrating a closed cross-section portion 83 (hereinafter also referred to as the "upper-side closed cross-section portion 83") having the closed cross-sectional space 83a inside, and a lower flange 85 extending downward from a vehicle-width-direction inner end of the upper-side closed cross-section portion 83 and a lower end thereof. As illustrated in the same figure, the side sill lower 82 is formed by integrating a closed cross-section portion 84 (hereinafter also referred to as the "lower-side closed cross-section portion 84") having the closed cross-sectional space 84s inside, and an upper flange 86 extending upward from the vehicle-width-direction inner side of the lower-side closed cross-section portion 84 and an upper end thereof.

As illustrated in FIG. 2, the upper-side closed cross-section portion 83 and the lower-side closed cross-section portion 84 both extend in the vehicle front-rear direction so as to overlap with the pillars 11 and 12 on the front and rear sides in a vehicle side view. The side sill lower 82 of the present embodiment extends over the full length of the side sill 8 in the vehicle front-rear direction.

As illustrated in FIG. 1, the upper-side closed cross-section portion 83 and the lower-side closed cross-section portion 84 are both formed to be longer in the vehicle width direction than the pillars 11 and 12 on the front and rear sides. The upper-side closed cross-section portion 83 and the lower-side closed cross-section portion 84 in the present embodiment are both formed so that outer ends thereof in the vehicle width direction project toward the vehicle-width-direction outer side relative to vehicle-width-direction outer faces of the pillars 11 and 12 on the front and rear sides.

As illustrated in FIG. 6, an upper wall 83u and lower wall 83d of the upper-side closed cross-section portion 83 are both formed inclinedly so as to be located upward toward the vehicle-width-direction outer side and extend parallel to each other in the vehicle front-rear direction. Note that as illustrated in FIG. 6, in the upper wall 83u, an outer-side portion in the vehicle width direction relative to the pillars 11 and 12 on the front and rear sides is formed in such a manner that an interval with the lower wall 83d in the vehicle up-down direction decreases stepwise. That is, the upper-side closed cross-section portion 83 is formed in a tapered shape in which the outer side in the vehicle width direction becomes gradually narrower in the vehicle up-down direction.

As illustrated in FIG. 6, on the vehicle-width-direction outer side relative to the upper-side closed cross-section portion 83 of the side sill upper 81, an eaves 87 is provided which extends in a flange shape outward in the vehicle width direction and downward from a vehicle-width-direction outer end of the upper-side closed cross-section portion 83 and covers the first pre-silencer 32 as an exhaust system member, which will be described later, from above.

As also illustrated in FIG. 6, a lower wall 84d of the lower-side closed cross-section portion 84 is substantially horizontally formed along the vehicle width direction, while an upper wall 84u is moderately inclined so as to be located downward toward the vehicle-width-direction outer side. Thereby, the lower-side closed cross-section portion 84 is formed in a substantially triangular shape in which a cross section orthogonal to the vehicle front-rear direction becomes longer in the vehicle width direction than in the vehicle up-down direction and the length in the vehicle up-down direction becomes shorter toward the vehicle-width-direction outer side.

Figure 4A:
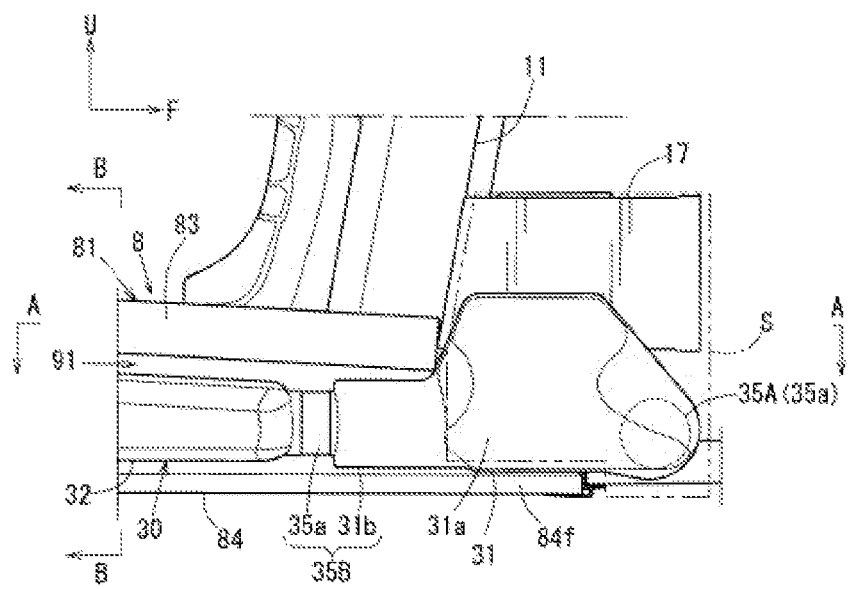
FIG. 4A is a left side view illustrating the front portion of the side vehicle body structure of the present embodiment.
Figure 4B:
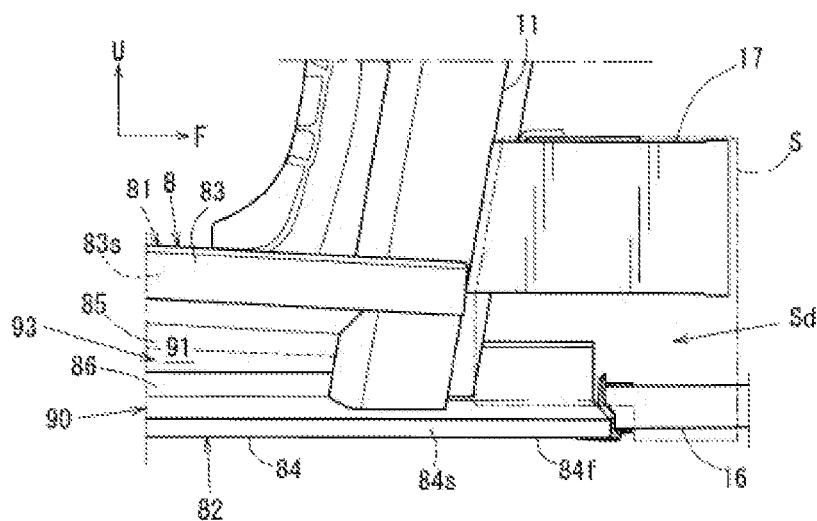
FIG. 4B is a left side view illustrated with the exhaust system member removed from FIG. 4A.
Figure 5:
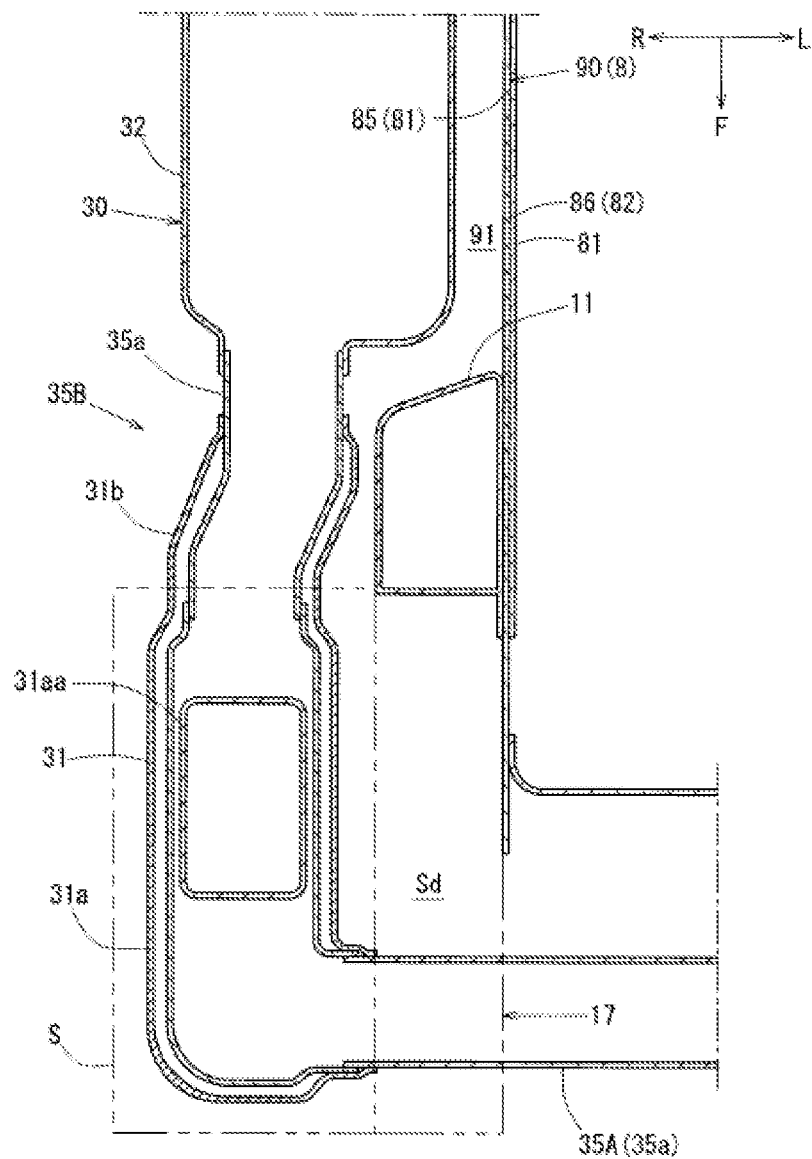
FIG. 5 is a cross-sectional view taken along line A-A in FIG. 4A.
Figure 6:
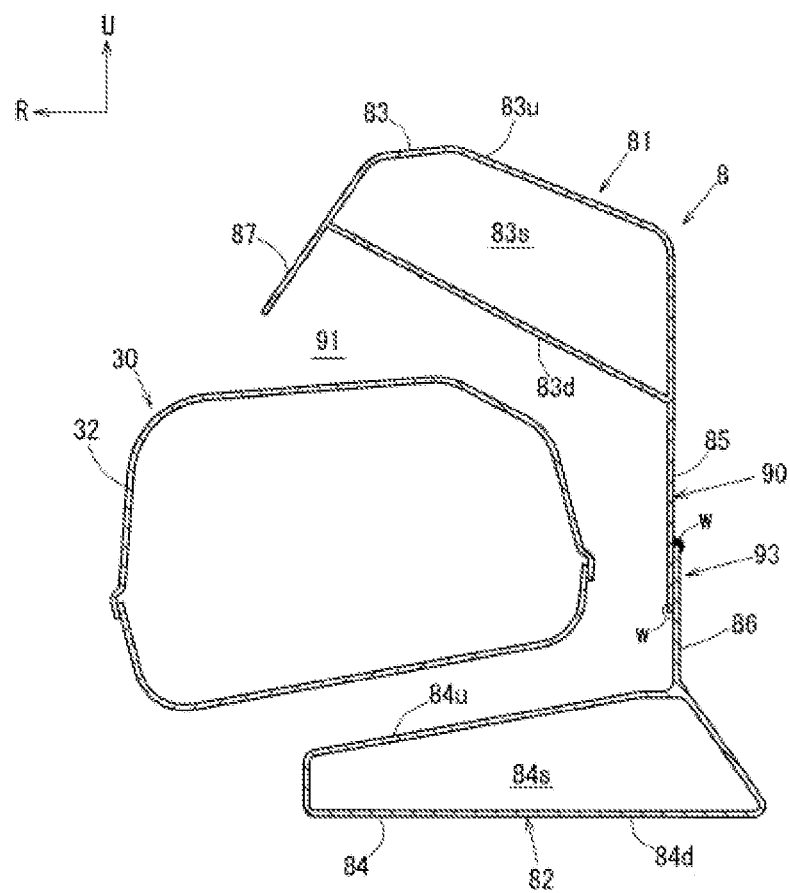
FIG. 6 is a cross-sectional view taken along line B-B in FIG. 4A.

As illustrated in FIGS. 4B, 5, and 6, in the above-described side sill upper 81 and side sill lower 82, the lower flange 85 and the upper flange 86 overlap with each other in a vehicle side view (in the vehicle up-down direction and the vehicle front-rear direction). In this example, as illustrated in FIG. 5, the lower flange 85 of the side sill upper 81 and the upper flange 86 of the side sill lower 82 are disposed in such a manner that the lower flange 85 and the upper flange 86 are respectively located on the vehicle-width-direction outer side and the vehicle-width-direction inner side, in a mutually overlapping portion 93. The side sill upper 81 and the side sill lower 82 are joined to each other in this overlapping portion 93 by being arc-welded (MIG welding, in this example) alternately from the vehicle-width-direction inner and outer sides along the vehicle front-rear direction (see reference character w in FIG. 6).

As described above, in the side sill 8, the lower flange 85 and the upper flange 86 can be integrated by welding the mutually overlapping portion 93, forming a coupling wall 90 coupling vehicle-width-direction inner ends of the upper-side closed cross-section portion 83 and the lower-side closed cross-section portion 84 in the up-down direction. Thereby, the side sill 8 is configured so that the closed cross-section portion 83 of the side sill upper 81 and the closed cross-section portion 84 of the side sill lower 82 are disposed so as to be spaced apart from each other in the up-down direction via the coupling wall 90 and, between these closed cross-section portions 83 and 84 on the upper and lower sides and the coupling wall 90, a recess 91 is provided which opens toward the vehicle-width-direction outer side (see FIGS. 4B, 5, and 6).

As illustrated in FIG. 2, the side sill 8 extends in the vehicle front-rear direction so as to form the lower edge 13c of the door opening 13 of a vehicle body side portion, as described above. Furthermore, the side sill 8 extends inclinedly in the vehicle front-rear direction in such a manner that the upper-side closed cross-section portion 83, namely, an upper end of the side sill 8, is located downward toward the front side (see FIGS. 2, and 4A and (b)). Thereby, the lower edge 13c of the door opening 13 can be formed inclinedly so as to be located upward toward the vehicle rear side along the upper-side closed cross-section portion 83 (see FIG. 2). Accordingly, while an increase in the size of the door opening 13 over the entire vehicle front-rear direction is avoided, the vehicle front side can be located downward compared with the vehicle rear side, so that, when the occupant enters and exits the vehicle cabin space via the door opening 13, smooth accessibility is enabled.

The above-described side sill 8 and pillars 11 and 12 on the front and rear sides are integrally joined by arc welding (MIG welding, in this example). Specifically, as illustrated in FIGS. 3B and 4B, the upper-side closed cross-section portion 83 and the lower-side closed cross-section portion 84 in the present embodiment both extend in the vehicle front-rear direction so as to overlap with the hinge pillar 11 in the vehicle front-rear direction. In this example, in the upper-side closed cross-section portion 83, a front end extends up to substantially the same position as a front end of the hinge pillar 11 in the vehicle front-rear direction. On the other hand, the lower-side closed cross-section portion 84 includes a front extending portion 84f extending toward the vehicle front side relative to each of the front ends of the upper-side closed cross-section portion 83 and the hinge pillar 11 in the vehicle front-rear direction, and is integrally formed with the front extending portion 84f. Note that the front extending portion 84f extends toward the vehicle front side until a front end thereof is located on the vehicle rear side relative to a front end of the tire stopper frame 17.

Furthermore, as illustrated in the same figures, at a front portion of the side sill 8, the hinge pillar 11 is provided to protrude at the lower-side closed cross-section portion 84 in such a manner that the hinge pillar 11 projects toward the vehicle upper side from a vehicle-width-direction inner-side portion of the upper-side closed cross-section portion 83, in a posture inclined so as to be located on the vehicle front side toward the vehicle upper side. The hinge pillar 11 is an extruded member made of an aluminum alloy which is extruded in a rectangular shape in which a cross section orthogonal to the longitudinal direction inside forms a closed cross-section. In the hinge pillar 11 as described above, a portion facing each of the upper-side closed cross-section portion 83, the coupling wall 90, and the lower-side closed cross-section portion 84 is integrally joined thereto by arc welding or the like.

As illustrated in FIG. 2, at a rear portion of the side sill 8, the rear pillar 12 is provided to protrude in a columnar shape at the lower-side closed cross-section portion 84 in such a manner that the rear pillar 12 projects toward the vehicle upper side from the vehicle-width-direction inner-side portion of the upper-side closed cross-section portion 83, in a posture inclined so as to be located on the vehicle rear side toward the vehicle upper side. The rear pillar 12 is an extruded member made of an aluminum alloy which is extruded in a rectangular shape in which a cross section orthogonal to the longitudinal direction inside forms a closed cross-section (see FIG. 6). In the rear pillar 12 as described above, a portion facing each of the upper-side closed cross-section portion 83, the coupling wall 90, and the lower-side closed cross-section portion 84 is integrally joined thereto by arc welding or the like.

The above-described tire stopper frame 17 is also referred to as a reinforcement for small overlap collision resistance (reinforcement for SORB) and is a frame for receiving the front wheel Hf (see FIGS. 1 and 2) receding at the time of small overlap collision, and suppressing entering of the front wheel Hf into the vehicle cabin 1. As illustrated in FIGS. 1, 2, 3A and (b), 4A and (b), 7, and 8, the tire stopper frame 17 has a rear end joined to a front face of the hinge pillar 11, and a front end horizontally extending in the vehicle front-rear direction up to a position in front of a rearmost end of the front wheel Hf. Thereby, in the tire stopper frame 17, the front end is disposed at a position spaced apart toward the vehicle rear side from the rearmost end of the front wheel Hf (see FIGS. 1 and 2). The tire stopper frame 17 is formed by extrusion in such a manner that a cross section thereof which is orthogonal to the vehicle front-rear direction is formed in a closed cross-sectional shape.

Furthermore, as illustrated in FIG. 2, the tire stopper frame 17 is provided in such a manner that the front end thereof overlaps with a vehicle-width-direction length area of the front wheel Hf in the vehicle width direction so as to be capable of reliably receiving the receding front wheel Hf (see FIG. 1). In this example, the tire stopper frame 17 is provided in such a manner that the front end thereof is located slightly near the vehicle-width-direction inner side relative to a center (center of gravity) position of the front wheel Hf in the vehicle width direction in a range of overlapping with the vehicle-width-direction length area of the front wheel Hf in the vehicle width direction, so that the front end thereof, while receiving the receding front wheel Hf, can cause the front wheel Hf to move toward the vehicle-width-direction outer side.

Here, as described above, the tire stopper frame 17 is provided slightly near the vehicle-width-direction inner side relative to the center (center of gravity) position of the front wheel Hf in the vehicle width direction, so that the vehicle-width-direction outer side of the tire stopper frame 17 has a so-called dead space S. Specifically, as illustrated in FIGS. 3B, 4B, 5, 7, and 8, the dead space S is provided on the vehicle front side relative to the front end of the hinge pillar 11, and between the tire stopper frame 17 and an outer-side panel (illustration omitted) such as a fender panel (illustration omitted) located on the vehicle-width-direction outer side of the tire stopper frame 17 and forming a design face of a side portion of the front vehicle body 2.

Figure 7:
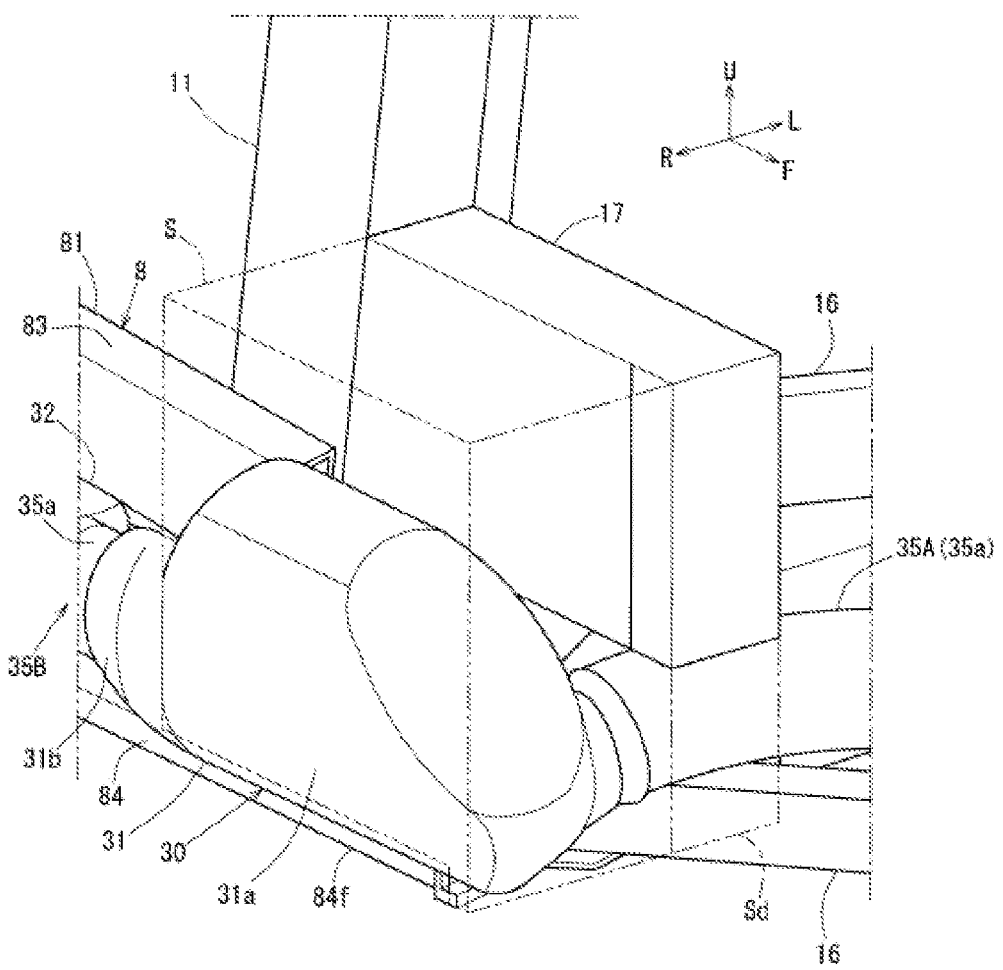
FIG. 7 is a perspective view of the front portion of the side vehicle body structure of the present embodiment as viewed from the vehicle-width-direction outer side and the vehicle upper and front side.

As illustrated in FIGS. 3A, 4A, and 7, the front extending portion 84f provided at a front portion of the lower-side closed cross-section portion 84 of the side sill 8 extends toward the vehicle front side up to below the dead space S.

Figure 8:
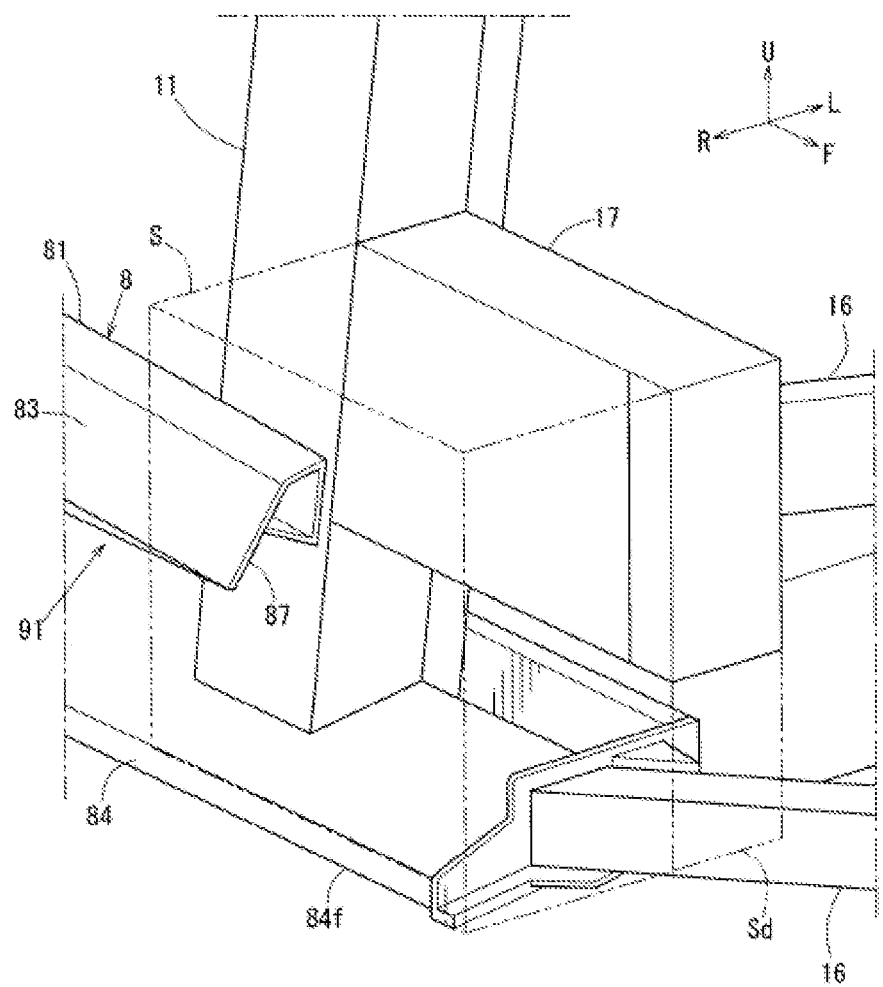
FIG. 8 is a perspective view illustrated with the exhaust system member removed from FIG. 7.

As illustrated in FIG. 2, the tire stopper frame 17 is provided in such a manner that the center of the front end thereof in the up-down direction is located at the same height as a center Hfo (center of gravity) of the front wheel Hf in a vehicle side view or at around the height so that the front end thereof can reliably receive the receding front wheel Hf. In other words, in this example, as illustrated in FIG. 4, the tire stopper frame 17 is joined to the front face of the hinge pillar 11 at a higher position than the upper wall 84u of the front extending portion 84f of the side sill 8. Thus, a space Sd (a gap in the vehicle up-down direction) is provided below the tire stopper frame 17 horizontally extending toward the vehicle front side from the front face of the hinge pillar 11, that is, as illustrated in FIGS. 4B, 5, and 8, below the tire stopper frame 17 in a vehicle side view.

As illustrated in FIGS. 1 and 2, in the exhaust apparatus 30, each of the GPF 31, the first pre-silencer 32, and the second pre-silencer 33 is disposed in this order toward the vehicle rear side along a lower portion of the vehicle body side portion (a vehicle right-side portion, in this example). Specifically, the GPF 31 includes the body 31a in which the filter 31aa is incorporated, and a connection portion 31b formed to have a smaller width than the body 31a. In the GPF 31, the body 31a is mainly disposed, in a vehicle body lower portion, on the vehicle front side relative to the hinge pillar 11 and on the vehicle-width-direction outer side relative to the tire stopper frame 17, namely, in the above-described dead space S.

Furthermore, the above-described front extending portion 84f provided at the front portion of the lower-side closed cross-section portion 84 of the side sill 8 extends forward relative to a position corresponding to the front end of the hinge pillar 11 in the vehicle front-rear direction. Specifically, the front extending portion 84f extends up to immediately under the GPF 31 disposed in the dead space S. The GPF 31 is supported so as to be placed on a top face of the front extending portion 84f.

The body 31a of the GPF 31 and the engine 23 (exhaust manifold 24) provided on the vehicle-width-direction inner side relative to the body 31a are connected by the connection part 85A (hereinafter referred to as the "first connection part 85A") extending in the vehicle width direction between these. As illustrated in FIGS. 3A, 5, and 7, the first connection part 85A is formed by the exhaust pipe 35a provided as a part of the exhaust apparatus 30. Furthermore, in a vehicle plan view, the tire stopper frame 17 intervenes between the GPF 31 and the engine 23, while the first connection part 85A extends in the vehicle width direction across the space Sd provided below the tire stopper frame 17.

As illustrated in FIGS. 2, 4A, and 5, the first pre-silencer 32 is formed to have a long length in the vehicle front-rear direction along the side sill 8 provided at the lower edge 13c of the door opening 13. The first pre-silencer 32 is formed to have substantially a constant length in the vehicle width direction over the full length in the vehicle front-rear direction and formed in a vehicle side view shape in which the first pre-silencer 32 is inclined so as to become gradually higher toward the vehicle rear side.

The recess 91 is formed to have a length in the vehicle front-rear direction which is slightly longer than that of the first pre-silencer 32 in the vehicle front-rear direction. Furthermore, the recess 91 has a length in the vehicle up-down direction which is slightly longer than that of the first pre-silencer 32 in the vehicle up-down direction, and is formed in an inclined shape so as to become gradually higher toward the vehicle rear side corresponding to the above-described vehicle side view shape of the first pre-silencer 32.

As illustrated in FIGS. 3A, 5, and 6, the first pre-silencer 32 is disposed on the vehicle-width-direction outer side relative to a vehicle-width-direction inner end of the side sill 8 in such a manner that at least a part of the first pre-silencer 32 in the vehicle width direction overlaps with the side sill 8. That is, the entire first pre-silencer 32 except for an outer-side portion thereof in the vehicle width direction is accommodated in the recess 91 of the side sill 8 over the full length of the vehicle front-rear direction (see FIG. 3).

In this state, a vehicle-width-direction inner end of the first pre-silencer 32 is disposed on the vehicle-width-direction outer side relative to the coupling wall 90 (vehicle width inner wall) of the side sill 8, and the first pre-silencer 32 is supported so as to be placed on a top face of the lower-side closed cross-section portion 84.

In this state, the first pre-silencer 32 is disposed so as to overlap with the eaves 87 and the upper-side closed cross-section portion 83 which are provided in the side sill upper 81, in the vehicle width direction. The eaves 87 and the upper-side closed cross-section portion 83 in the side sill 8 are provided so as to cover the first pre-silencer 32 from immediately thereabove.

As illustrated in FIGS. 3A, 4A, 5, and 7, the GPF 31 disposed on the vehicle front side of the hinge pillar 11 and the first pre-silencer 32 disposed on the vehicle rear side thereof are connected by the connection part 35B (hereinafter referred to as the "second connection part 35B"). The second connection part 35B is formed by the exhaust pipe 35a and the connection portion 31b provided in the GPF 31. The connection portion 31b provided in the GPF 31 is formed in a pipe shape extending toward the vehicle rear side from a rear end of the body 31a of the GPF 31 and is connected to the exhaust pipe 35a so as to fit the exhaust pipe 35a from a front portion thereof.

As illustrated in FIG. 5, the second connection part 35B is formed to have a smaller length in the vehicle width direction than both the GPF 31 and the first pre-silencer 32. Further, the second connection part 35B substantially horizontally extends at a position on the vehicle-width-direction outer side as close as possible to the hinge pillar 11 beside the hinge pillar 11 in the vehicle front-rear direction. The second connection part 35B is formed to have a length which is longer than that of the hinge pillar 11 in the vehicle front-rear direction so as to be capable of connecting the GPF 31 disposed on the vehicle front side of the hinge pillar 11 and the first pre-silencer 32 disposed on the vehicle rear side of the hinge pillar 11.

As described above, in a state where, while the exhaust pipe 35a is disposed near the hinge pillar 11 side as much as possible (on the vehicle-width-direction inner side), the GPF 31, the exhaust pipe 35a, and the first pre-silencer 32 are disposed in substantially a linear shape along the vehicle front-rear direction, in the first pre-silencer 32, at least a vehicle-width-direction inner-side portion relative to a vehicle-width-direction outer face of the hinge pillar 11 is accommodated in the recess 91 of the side sill 8, while the GPF 31 (the body 31a of the GPF 31, in particular) is disposed in the dead space S, as described above.

Furthermore, as described above, in the side sill upper 81 of the side sill 8, namely, in the eaves 87 and the upper-side closed cross-section portion 83, each of front ends is formed up to substantially the same position as the front end of the hinge pillar 11 in the vehicle front-rear direction (see FIGS. 2 and 4A and (b)). Thus, so as to cover not only the first pre-silencer 32 but also the second connection part 35B disposed on the vehicle-width-direction outer side of the hinge pillar 11 from the vehicle upper side, the eaves 87 and the upper-side closed cross-section portion 83 are each provided at a position spaced apart upward from the second connection part 35B.

As further illustrated in FIG. 2, the second pre-silencer 33 is disposed at a portion going around, with respect to the rear pillar 12, from forward to rearward and from the outer side to the inner side in the vehicle width direction. The second pre-silencer 33 as described above is connected to the connection part 35C (also referred to as the "third connection part 35C") connecting to the first pre-silencer 32 provided on the vehicle front side at a front end portion of the body 33a, and is connected to the connection part 35D (also referred to as the "fourth connection part 35D") connecting to the main silencer 34 (see FIG. 1) provided at the vehicle-width-direction center and on the vehicle rear side, on the vehicle-width-direction inner side of the body 33a and at a vehicle rear portion.

As illustrated in FIGS. 1 and 2, the above-described side vehicle body structure of the vehicle in the present embodiment is a side vehicle body structure of a vehicle which includes the engine 23 (internal combustion engine) (see FIG. 1) equipped on the front side of the dash panel 9 (partition wall) defining the front edge of the vehicle cabin space 1s, the exhaust apparatus 30 through which exhaust gas exhausted from the engine 23 passes, and the hinge pillar 11 (pillar) extending in the vehicle up-down direction, wherein, as illustrated in FIGS. 3A and 4A, the exhaust apparatus 30 includes the GPF 31 (first exhaust system member) beside the hinge pillar 11 in the vehicle front-rear direction from the vehicle-width-direction outer side of the hinge pillar 11 and provided forward relative to the hinge pillar 11, the first pre-silencer 32 (second exhaust system member) provided rearward relative to the hinge pillar 11, and the second connection part 35B (connection part) connecting these exhaust system members 31 and 32, and, as illustrated in FIGS. 3A, 4A, 5, and 7, the second connection part 35B is formed to have the smaller length in the vehicle width direction than the GPF 31 and the first pre-silencer 32 and is disposed at a position overlapping with the hinge pillar 11 in the vehicle front-rear direction.

According to this configuration, the second connection part 35B having the smaller length in the vehicle width direction than the GPF 31 and the first pre-silencer 32 is disposed at the position of the hinge pillar 11 in the vehicle front-rear direction, so that, while a cross section (the length in the vehicle width direction) of the hinge pillar 11 is maintained, widening of the vehicle body can be avoided by, in the exhaust apparatus 30, a portion beside the hinge pillar 11 in the front-rear direction.

Accordingly, while a shock absorption performance of the vehicle body at the time of collision and rigidity of the vehicle body are ensured, widening of the vehicle body is avoided, contributing to enhancement of motion performance.

In one aspect of the present disclosure, as illustrated in FIGS. 1 and 2, provided is the side sill 8 (vehicle body structure) extending along the vehicle front-rear direction on the side of the floor panel (floor) forming the floor surface of the vehicle cabin space 1s, wherein, as illustrated in FIG. 3, the side sill 8 is provided so as to overlap with the hinge pillar 11 in a vehicle side view and overlap with the second connection part 35B in the vehicle width direction.

According to this configuration, the side sill 8 overlaps with the second connection part 35B in the vehicle width direction at an overlapping portion with the hinge pillar 11 in a vehicle side view (see FIG. 4A), so that it is possible to secure a long cross-sectional length of the side sill 8 in the vehicle width direction within a range in which the vehicle body is widened by including the second connection part 35B on the vehicle-width-direction outer side relative to the hinge pillar 11. Accordingly, while the cross-sectional length (rigidity) of the side sill in the vehicle width direction is maintained, widening of the vehicle body can be avoided.

In another aspect of the present disclosure, as illustrated in FIGS. 2 and 3A, the side sill 8 overlaps with the first pre-silencer 32 in a vehicle side view and, as illustrated in FIGS. 3B, 4B, 5, and 8, at an overlapping portion in this vehicle side view, has the recess 91 having a cross section recessed toward the vehicle-width-direction inner side relative to a vehicle-width-direction outer end of the hinge pillar 11 from the vehicle-width-direction outer side in a cross-sectional view orthogonal to the vehicle front-rear direction, and, as illustrated in FIGS. 3 to 5 and 7, the first pre-silencer 32 is disposed at the recess 91.

According to this configuration, when the second connection part 35B is located from the vehicle-width-direction outer side at a position having the hinge pillar 11 in the vehicle front-rear direction, a portion in the first pre-silencer 32 which is located on the vehicle-width-direction inner side relative to the vehicle-width-direction outer end of the hinge pillar 11 can be disposed within the recess 91. Accordingly, even in a case where the first pre-silencer 32 is formed to have a larger length in the vehicle width direction by the second connection part 35B, the second connection part 35B can be disposed near the side (vehicle-width-direction inner side) having the hinge pillar 11 in the vehicle width direction, so that widening of the vehicle can be avoided. In other words, it is possible to push out the hinge pillar 11 toward the vehicle-width-direction outer side, so that the cross-sectional length (rigidity) of the hinge pillar 11 in the vehicle width direction can be maintained.

In a further aspect of the present disclosure, as illustrated in FIGS. 3A and 6, the side sill 8 includes the lower-side closed cross-section portion 84 extending between the front and rear sides of the hinge pillar 11 so as to be capable of supporting each of the GPF 31, the second connection part 35B, and the first pre-silencer 32 from the lower side. According to this configuration, each of the GPF 31, the second connection part 35B, and the first pre-silencer 32 which are disposed in the vehicle front-rear direction beside the hinge pillar 11 from the vehicle-width-direction outer side of the hinge pillar 11 can be stably supported by the lower-side closed cross-section portion 84 of the side sill 8. Furthermore, the lower-side closed cross-section portion 84 of the side sill 8 can be provided over the periphery on the vehicle front and rear sides of the hinge pillar 11 and the periphery on the vehicle-width-direction outer side thereof, so that the side sill 8 (lower-side closed cross-section portion 84) can have an enhanced coupling strength (rigidity) with the hinge pillar 11.

In a still further aspect of the present disclosure, as illustrated in FIGS. 3A and 6, on the vehicle-width-direction inner side of the GPF 31, the tire stopper frame 17 serving as a frame member is provided which overlaps with the GPF 31 in a vehicle side view and has an outer face in the vehicle width direction which is provided to be substantially flush with the vehicle-width-direction outer face of the hinge pillar 11; as illustrated in FIGS. 4B, 5, and 8, the space Sd is configured below the tire stopper frame 17; and as illustrated in FIGS. 1, 3A, 5 and U7, the first connection part 35A (secondary connection part) connecting the engine 23 provided on the inner side of the tire stopper frame 17 in the vehicle width direction and the GPF 31 provided on the outer side of the tire stopper frame 17 in the vehicle width direction is routed across the space Sd. According to this configuration, the front wheel Hf receding at the time of overlap collision can be received by the tire stopper frame 17, so that the front wheel Hf can be prevented from entering the vehicle cabin 1.

When the second connection part 35B is disposed near the hinge pillar 11 side in the vehicle width direction, the GPF 31 is disposed near the tire stopper frame 17 side in the vehicle width direction. However, even in such a case, the first connection part 35A can be routed below the tire stopper frame 17, so that the first connection part 35A and the tire stopper frame 17 do not interfere with each other. Accordingly, the second connection part 35B can be caused to firmly come near the hinge pillar 11 side in the vehicle width direction, so that widening of the vehicle body can be avoided consequently.

Although the tire stopper frame 17 intervenes between the engine 23 and the GPF 31 in the vehicle width direction, the first connection part 35A can be routed by using the space Sd provided below the tire stopper frame 17, as described above. Accordingly, the engine 23 and the GPF 31 can be connected at a shortest possible distance by the exhaust pipe 35a, so that exhaust gas from the engine 23 can be smoothly introduced into the GPF 31 consequently.

The present disclosure is not limited to only the configurations of the above-described embodiment and can be formed in various embodiments.

What is claimed is:

1. A side vehicle body structure of a vehicle, comprising:
an internal combustion engine equipped on a front side of a partition wall defining a front edge of a vehicle cabin space;
an exhaust apparatus through which exhaust gas exhausted from the internal combustion engine passes; and
a pillar extending in a vehicle up-down direction,
wherein the exhaust apparatus comprises:
a first exhaust system member located beside the pillar in a vehicle front-rear direction from a vehicle-width-direction outer side of the pillar and extending forward relative to the pillar;
a second exhaust system member provided rearward relative to the pillar; and a connection part connecting the first and second exhaust system members, wherein the connection part has a smaller length in a vehicle width direction than at least one of the first exhaust system member and the second exhaust system member and is disposed at a position overlapping with the pillar in the vehicle front-rear direction, wherein the first exhaust system member is a gasoline particulate filter, and the second exhaust system member is a silencer.

2. The side vehicle body structure of a vehicle according to claim 1, wherein the connection part extends substantially horizontally at a position on the vehicle-width-direction outer side proximal to the pillar beside the pillar in the vehicle front-rear direction.

3. The side vehicle body structure of a vehicle according to claim 1, wherein the connection part has a length greater than that of the pillar in the vehicle front-rear direction such that it connects the gasoline particulate filter and the silencer.

4. A side vehicle body structure of a vehicle, comprising:
an internal combustion engine equipped on a front side of a partition wall defining a front edge of a vehicle cabin space;
an exhaust apparatus through which exhaust gas exhausted from the internal combustion engine passes; and
a pillar extending in a vehicle up-down direction,
wherein the exhaust apparatus comprises:
a first exhaust system member located beside the pillar in a vehicle front-rear direction from a vehicle-width-direction outer side of the pillar and extending forward relative to the pillar;
a second exhaust system member provided rearward relative to the pillar; and
a connection part connecting the first and second exhaust system members,
wherein the connection part has a smaller length in a vehicle width direction than both the first exhaust system member and the second exhaust system member and is disposed at a position overlapping with the pillar in the vehicle front-rear direction,
wherein the first exhaust system member is a gasoline particulate filter, and the second exhaust system member is a silencer.

5. A side vehicle body structure of a vehicle, comprising:
an internal combustion engine equipped on a front side of a partition wall defining a front edge of a vehicle cabin space;
an exhaust apparatus through which exhaust gas exhausted from the internal combustion engine passes;
a pillar extending in a vehicle up-down direction; and
a vehicle body structure extending along a vehicle front-rear direction on a side of a floor forming a floor surface of the vehicle cabin space,
wherein the exhaust apparatus comprises:
a first exhaust system member located beside the pillar in the vehicle front-rear direction from a vehicle-width-direction outer side of the pillar and extending forward relative to the pillar;
a second exhaust system member provided rearward relative to the pillar; and
a connection part connecting the first and second exhaust system members,
wherein the connection part has a smaller length in a vehicle width direction than at least one of the first exhaust system member and the second exhaust system member and is disposed at a position overlapping with the pillar in the vehicle front-rear direction, wherein the vehicle body structure overlaps with the pillar in a vehicle side view and overlaps with the connection part in the vehicle width direction, wherein the vehicle body structure overlaps with the second exhaust system member in a vehicle side view and, at an overlapping portion in the vehicle side view, comprises a recess comprising a cross section recessed toward a vehicle-width-direction inner side relative to a vehicle-width-direction outer end of the pillar from a vehicle-width-direction outer side in a cross-sectional view orthogonal to the vehicle front-rear direction, and the second exhaust system member is disposed at the recess.

6. The side vehicle body structure of a vehicle according to claim 1,
wherein a frame member is disposed on a vehicle-width-direction inner side of the first exhaust system member, the frame member overlapping with the first exhaust system member in a vehicle side view and comprising an outer face in the vehicle width direction, the outer face being substantially flush with a vehicle-width-direction outer face of the pillar or located on a vehicle-width-direction inner side relative to the vehicle-width-direction outer face, and a secondary connection part is routed below the frame member, the secondary connection part connecting the internal combustion engine provided on an inner side of the frame member in the vehicle width direction and the first exhaust system member provided on an outer side of the frame member in the vehicle width direction.

7. The side vehicle body structure of a vehicle according to claim 5,
wherein the vehicle body structure extends between front and rear sides of the pillar so as to be capable of supporting each of the first exhaust system member, the connection part, and the second exhaust system member from a lower side.

8. The side vehicle body structure of a vehicle according to claim 7,
wherein a frame member is disposed on a vehicle-width-direction inner side of the first exhaust system member, the frame member overlapping with the first exhaust system member in a vehicle side view and comprising an outer face in the vehicle width direction, the outer face being substantially flush with a vehicle-width-direction outer face of the pillar or located on a vehicle-width-direction inner side relative to the vehicle-width-direction outer face, and a secondary connection part is routed below the frame member, the secondary connection part connecting the internal combustion engine provided on an inner side of the frame member in the vehicle width direction and the first exhaust system member provided on an outer side of the frame member in the vehicle width direction.

9. A side vehicle body structure of a vehicle, comprising:
an internal combustion engine equipped on a front side of a partition wall defining a front edge of a vehicle cabin space;

an exhaust apparatus through which exhaust gas exhausted from the internal combustion engine passes; and
a pillar extending in a vehicle up-down direction,
wherein the exhaust apparatus comprises:
a first exhaust system member located beside the pillar in a vehicle front-rear direction from a vehicle-width-direction outer side of the pillar and extending forward relative to the pillar;
a second exhaust system member provided rearward relative to the pillar; and
a connection part connecting the first and second exhaust system members,
wherein the connection part has a smaller length in a vehicle width direction than at least one of the first exhaust system member and the second exhaust system member and is disposed at a position overlapping with the pillar in the vehicle front-rear direction,
wherein a frame member is disposed on a vehicle-width-direction inner side of the first exhaust system member, the frame member overlapping with the first exhaust system member in a vehicle side view and comprising an outer face in the vehicle width direction, the outer face being substantially flush with a vehicle-width-direction outer face of the pillar or located on a vehicle-width-direction inner side relative to the vehicle-width-direction outer face, and
a secondary connection part is routed below the frame member, the secondary connection part connecting the internal combustion engine provided on an inner side of the frame member in the vehicle width direction and the first exhaust system member provided on an outer side of the frame member in the vehicle width direction.

10. A side vehicle body structure of a vehicle, comprising:
an internal combustion engine equipped on a front side of a partition wall defining a front edge of a vehicle cabin space;
an exhaust apparatus through which exhaust gas exhausted from the internal combustion engine passes;
a pillar extending in a vehicle up-down direction; and
a vehicle body structure extending along a vehicle front-rear direction on a side of a floor forming a floor surface of the vehicle cabin space,
wherein the exhaust apparatus comprises:
a first exhaust system member located beside the pillar in the vehicle front-rear direction from a vehicle-width-direction outer side of the pillar and extending forward relative to the pillar;
a second exhaust system member provided rearward relative to the pillar; and
a connection part connecting the first and second exhaust system members,
wherein the connection part has a smaller length in a vehicle width direction than at least one of the first exhaust system member and the second exhaust system member and is disposed at a position overlapping with the pillar in the vehicle front-rear direction,
wherein the vehicle body structure overlaps with the pillar in a vehicle side view and overlaps with the connection part in the vehicle width direction,
wherein a frame member is disposed on a vehicle-width-direction inner side of the first exhaust system member, the frame member overlapping with the first exhaust system member in a vehicle side view and comprising an outer face in the vehicle width direction, the outer face being substantially flush with a vehicle-width-direction outer face of the pillar or located on a vehicle-width-direction inner side relative to the vehicle-width-direction outer face, and
a secondary connection part is routed below the frame member, the secondary connection part connecting the internal combustion engine provided on an inner side of the frame member in the vehicle width direction and the first exhaust system member provided on an outer side of the frame member in the vehicle width direction.

11. A side vehicle body structure of a vehicle, comprising:
an internal combustion engine equipped on a front side of a partition wall defining a front edge of a vehicle cabin space;
an exhaust apparatus through which exhaust gas exhausted from the internal combustion engine passes;
a pillar extending in a vehicle up-down direction; and
a vehicle body structure extending along a vehicle front-rear direction on a side of a floor forming a floor surface of the vehicle cabin space,
wherein the exhaust apparatus comprises:
a first exhaust system member located beside the pillar in the vehicle front-rear direction from a vehicle-width-direction outer side of the pillar and extending forward relative to the pillar;
a second exhaust system member provided rearward relative to the pillar; and
a connection part connecting the first and second exhaust system members,
wherein the connection part has a smaller length in a vehicle width direction than at least one of the first exhaust system member and the second exhaust system member and is disposed at a position overlapping with the pillar in the vehicle front-rear direction,
wherein the vehicle body structure overlaps with the pillar in a vehicle side view and overlaps with the connection part in the vehicle width direction,
wherein the vehicle body structure extends between front and rear sides of the pillar so as to be capable of supporting each of the first exhaust system member, the connection part, and the second exhaust system member from a lower side,
wherein a frame member is disposed on a vehicle-width-direction inner side of the first exhaust system member, the frame member overlapping with the first exhaust system member in a vehicle side view and comprising an outer face in the vehicle width direction, the outer face being substantially flush with a vehicle-width-direction outer face of the pillar or located on a vehicle-width-direction inner side relative to the vehicle-width-direction outer face, and
a secondary connection part is routed below the frame member, the secondary connection part connecting the internal combustion engine provided on an inner side of the frame member in the vehicle width direction and the first exhaust system member provided on an outer side of the frame member in the vehicle width direction.

* * * * *